United States Patent [19]
Widmer

[11] Patent Number: 5,559,178
[45] Date of Patent: Sep. 24, 1996

[54] PROCESS FOR MANUFACTURING FRIABLE RUBBER BALES

[75] Inventor: Lincoln Widmer, Baton Rouge, La.

[73] Assignee: DSM Copolymer, Inc., Baton Rouge, La.

[21] Appl. No.: 182,749

[22] Filed: Jan. 18, 1994

Related U.S. Application Data

[60] Continuation of Ser. No. 823,701, Feb. 2, 1992, abandoned, which is a division of Ser. No. 435,198, Nov. 9, 1989, Pat. No. 5,098,635.

[51] Int. Cl.⁶ ........................................... C08K 3/26
[52] U.S. Cl. ............................ 524/425; 524/35; 524/43; 524/44; 524/424; 524/436; 524/446; 524/565; 524/566; 524/571
[58] Field of Search ................................. 524/425, 424, 524/446, 35, 43, 44, 424, 425, 436, 446, 565, 566, 571

[56] References Cited

U.S. PATENT DOCUMENTS

| | | | |
|---|---|---|---|
| 4,207,218 | 6/1980 | Jorgensen, Jr. et al. | 260/23.7 M |
| 4,508,569 | 4/1985 | Kumasaka et al. | 106/14.12 |
| 4,657,590 | 4/1987 | Gamblin | 106/22 F |
| 4,670,181 | 6/1987 | Mollinger et al. | 252/186.25 |

FOREIGN PATENT DOCUMENTS

| 46877/85 | 12/1988 | Australia . |
|---|---|---|
| 61102/90 | 2/1991 | Australia . |

*Primary Examiner*—Paul R. Michl
*Assistant Examiner*—John J. Guarriello
*Attorney, Agent, or Firm*—Rockey, Rifkin & Ryther

[57] ABSTRACT

A composition for coating wet rubber particles during extrusion and pelletization prior to drying comprising an inorganic partitioning agent, a thickener and binder reagent, water and a water soluble anionic dispersant, and the process for application to elastomers including those of low viscosity or high resin content to improve their processability during manufacture.

23 Claims, 2 Drawing Sheets

PROCESS FOR MANUFACTURING FRIABLE RUBBER BALES

This is a continuation of application Ser. No 07/823,701 filed on Feb. 2, 1992, now abandoned which is a divisional of application, Ser. No. 07/435,198 filed Nov. 9, 1989, now U.S. Pat. No. 5,098,639.

The present invention relates to a process for coating during extrusion and pelletization wet rubber crumb to produce a product that can be baled and is easily friable from bale form.

BACKGROUND OF THE INVENTION

Bulk synthetic rubber is commercially sold in the form of solid, dense bales weighing from 40 to 100 pounds. In this form, the rubber is easily and economically stored and shipped. These bales are conventionally processed by milling or masticating the bales, which may then be mixed with other components for vulcanization and fabrication.

This conventional process of converting the baled rubber to a processible form is expensive, in terms of the energy employed, to mill or masticate the bale. The equipment to perform this operation., such as a Banbury mixer or roll mill, is also expensive, but necessary to the conversion of the baled rubber to a form suitable for compounding.

Bulk rubber is also supplied in the form of pellets or powders having lower density and therefore greater volume than baled rubber. The increased volume results in an increase in the costs of storage and shipment. Moreover, under ordinary storage conditions, the increased temperature and pressure resulting from the stacking of containers of powdered rubber will bind the rubber into solid, dense masses which still require processing prior to fabrication. Thus, the need for Banburies or similar devices is not entirely avoided by the distribution of bulk rubber in pelletized or powdered form.

To overcome these problems, bulk rubber is also sold in the form of friable bales. Such bales are conventionally produced by dusting granulated dry rubber crumb with metal salts of organic acids or inorganic anti-caking agents prior to baling. In a variation of that process, the dry rubber is ground prior to mixing with the anti-caking agents. Because these anti-caking agents are rapidly absorbed into the rubber substrate, however, the shelf life for these friable bales is relatively short. After absorption of the anti-caking agents, friability is reduced and it is still necessary to mill or masticate the bale prior to processing. The stearate anti-caking agents also may act as accelerators during vulcanization, thereby limiting control of the vulcanization process in cases in which the amount and type of stearate present is unknown.

Such a process for producing friable bales is disclosed in U.S. Pat. No. 4,207,218. According to the process described therein, rubber particles are coated with an anti-caking agent selected from the group consisting of inorganic dusting agents, metal salts of organic acids and hard resins. The rubber particles and dry anti-caking agent are mixed in a conventional mixer or blender; the anti-caking agent may also be supplied in solution, suspension or emulsion form. The rubber particles are then spray- or dip-coated with the solution during the rubber coagulation and wash operation. The disadvantages associated with anti-caking agent absorption described generally above, render the process disclosed in that application inadequate.

Additionally, such processes are not useful for rubbers of low viscosity, i.e., particularly Mooney viscosity less than 30 ML1+4 (at 100° C.). Such rubbers cannot be dried using conventional drying processes, useful in the foregoing method of producing friable bales, since the low viscosity rubbers become tacky in conventional dryers. Moisture removal is impaired as a result of this heat softening, and the rubber agglomerates in the dryer and cannot be easily removed. Similar problems are presented for the production of bales of high acrylonitrile NBR (acrylonitrile content greater than 40 percent) and high styrene SBR (styrene content greater than 35 percent) of these types, since such NBR and SBR behave increasingly like thermoplastics, resulting in heat softening and cold flow in a conventional dryer.

SUMMARY OF THE INVENTION

It is thus an object of the present invention to provide a novel and superior method for coating particulate rubber to produce, upon processing of the coated rubber, friable bales It is another object of the invention to provide such a method for producing a friable baled rubber suitable for long term storage without deleterious consequences on the friability of the baled rubber.

It is another object of the invention to provide a method of producing friable bales of low viscosity rubbers of NBR having a high acrylonitrile content and SBR of high-bound styrene content.

Still another object of the invention is to provide a novel coating for particulate rubber enabling the production of friable bales.

A further object of the invention is to provide a coating that may be incorporated into the rubber substrate in later processing to produce desirable reinforcing characteristics.

These objects and other novel aspects of the invention will be described in detail in the specification of the invention set forth below.

The present invention relates to a spray coating composition for application to rubber comprising an inorganic partitioning agent, a thickener and binder reagent, water and a water soluble anionic dispersant.

The present invention also relates to a method of producing friable rubber bales which includes the steps of providing a wet rubber, and dewatering the wet rubber by passing the rubber through a dewatering extruder to obtain a rubber extrudate having a moisture content between about three and about seven percent. Following the dewatering step, the rubber extrudate is pelletized by cutting the rubber extrudate into pellets of a predetermined size effective to obtain desirable drying rate and product porosity.

The pellets are then spray coated with a spray coating composition comprising an inorganic partitioning agent, a thickener and binder reagent, water and a water soluble anionic dispersant, at substantially the same time as the rubber extrudate is cut from the extruder, and then air-conveyed to a dryer at substantially the same time as the pellets are being spray coated. The coated pellets are dried and compressed to produce bales.

The present invention further relates to friable rubber bales made by the process summarized above.

DETAILED DESCRIPTION OF THE INVENTION

Figure 1:
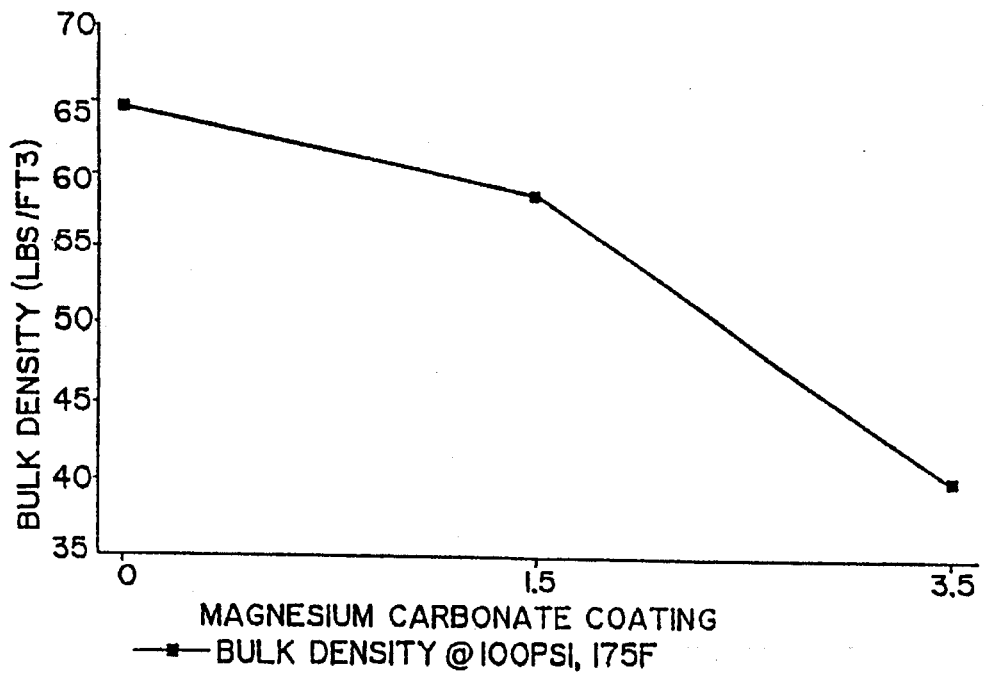
FIG. 1 is a graph illustrating the bulk density of baled NBR coated according to the present invention.

The method of the present invention is applicable to the production of friable bales of numerous synthetic rubbers, including, preferably, nitrile rubber of up to fifty percent by weight acrylonitrile, and styrene-butadiene rubber. The invention is also applicable to the production of friable bales of rubbers composed of elastomers resulting from the polymerization of one or more conjugated diolefins which are homopolymerizable to produce elastomeric polymers, and mixtures thereof with monoethylenically unsaturated monomers capable of producing copolymers therewith. Low viscosity rubbers may also be treated according to the present invention, to produce friable bales.

Among the rubbers to which the present invention is applicable are acrylate-butadiene rubber; butadiene rubber; chloroprene rubber; terpolymers of ethylene, propylene and a diene (with the residual unsaturated portion of the diene in the side chain); ethylene-propylene copolymer; isobutene-isoprene copolymer; isoprene rubber; nitrile-butadiene rubber; nitrile-isoprene rubber; styrene-butadiene rubber; carboxylated-nitrile-butadiene rubber; and carboxylated-styrene-butadiene rubber.

These rubbers are manufactured according to processes known to produce a wet rubber having, after mechanical dewatering and pelletization, a moisture content of about seven percent, and most preferably between three and seven percent. Mechanical dewatering of the rubber is accomplished by a dewatering extruder. The dewatered moist rubber is extruded and then pelletized by a blade adjusted to produce porous, substantially flat pellets. The pellets are preferably about 6 mm in diameter and about 2 mm in thickness. Pellets of other, similar thicknesses and diameters may be successfully employed in the method of the present invention, with the size of the pellet depending upon the rubber composition, product viscosity and desired drying speed. A fixed pellet size is desirable, however, to permit control over the amount of spray coating composition applied to each pellet.

At substantially the same time that the extrudate is being cut from the dewatering extruder, a spray coating composition is applied to the rubber pellets to produce rubber pellets that after drying may be compressed into friable bales. The spray coating composition comprises an inorganic partitioning agent, a cellulose ether thickener/binder, water and a water soluble anionic dispersant. The inorganic partitioning agent is an alkaline earth metal salt, such as the carbonate salts and preferably one or more compounds selected from the group consisting of $MgCO_3$, $CaCO_3$ and $ZnCO_3$, and is most preferably $MgCO_3$.

The thickener/binder is a compound selected from the group consisting of celluloses and hydroxyalkyl celluloses such as hydroxyethyl cellulose, hydroxypropyl cellulose, propylene glycol cellulose and hydroxypropyl methylcellulose, with the preferred compounds being propylene glycol and hydroxypropyl methylcellulose. These compounds are insoluble in the rubber substrate and will not be absorbed by the rubber even after long periods of storage.

Finally, the dispersant is a compound selected from the group consisting of alkali metal (e.g., sodium, potassium and ammonium) salts of carboxylated polyelectrolytes and sodium salts of condensed naphthalenesulfonic acid. Sodium polymethacrylate is preferred as the dispersant.

The spray coating composition is made according to the following steps. A sufficient quantity of thickener/binder, e.g. hydroxypropyl methylcellulose, is dissolved in cold water to obtain a thickener concentration not exceeding, and preferably about, 0.5 percent by weight. The thickener swells in the water to produce a clear, opalescent, viscous colloidal solution.

The inorganic partitioning agent, preferably $MgCO_3$, is ball milled to an average particle size of about 1.2 microns. It is understood, however, that particle sizes of the same order will be usefully employed in the present invention. The thickener solution is added to the milled partitioning agent at a level between about 0.1 to about 0.5 parts, and preferably about 0.25 parts, by weight thickener per 100 parts partitioning agent.

The partitioning agent is surrounded by the thickener, limiting its absorption into the rubber substrate. This produces a viscous mixture (viscosity about 2600 cps), to which 0.25–0.50 parts dispersant per 100 parts partitioning agent are added. The resulting mixture preferably has a viscosity of about 300 cps. A desired composition of the spray coating is characterized by the conditions noted in Table I, corresponding to the components and quantities set forth in Table II.

TABLE I

| | |
|---|---|
| Solids (weight percent) | 35.0 |
| Specific gravity | 1.24 |
| Viscosity (cps) | 200 |
| Dispersion pH | 10.9 |
| Particle size (microns) | 1.2 |

TABLE II

| Component | Parts (by weight) | Description |
|---|---|---|
| Magnesium Carbonate | 100 | Ball milled to 1.2 microns |
| METHOCEL ® F4M (Dow Chemical) | 0.15 | Hydroxypropyl methylcellulose |
| DARVAN ® 7 (R. T. Vanderbilt) | 0.25 | Sodium Polymethacrylate |
| Water | 185 | 40–55° F. |

The spray coating composition is applied by any of the known spray coating processes, with the limitation that the spray head include openings of sufficient size to readily accommodate milled partitioning agent particles. It has been found that the amount of spray coating composition applied to the rubber pellets, to achieve the desirable qualities to which the invention is directed, is from 0.2–5.0 parts per hundred parts rubber hydrocarbon, with a preferred rate being 3.0 parts coating per hundred parts rubber hydrocarbon.

Figure 3:
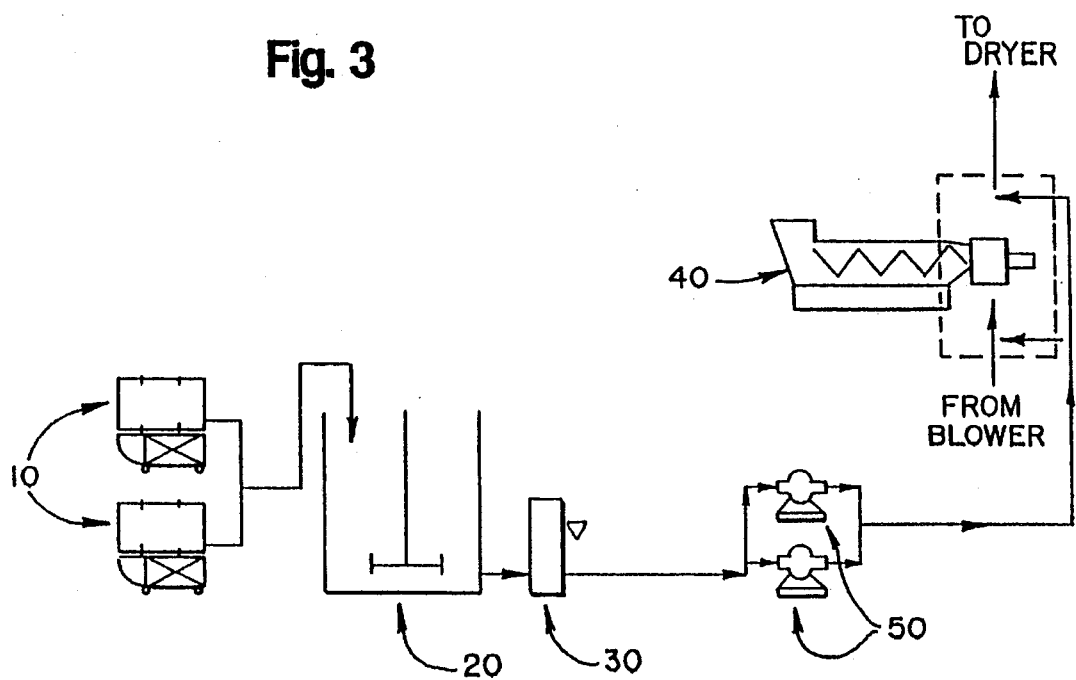
FIGS. 3 is a process flow diagram illustrating the steps involved in the application of the spray coating composition of the present invention to the rubber.
Figure 4:
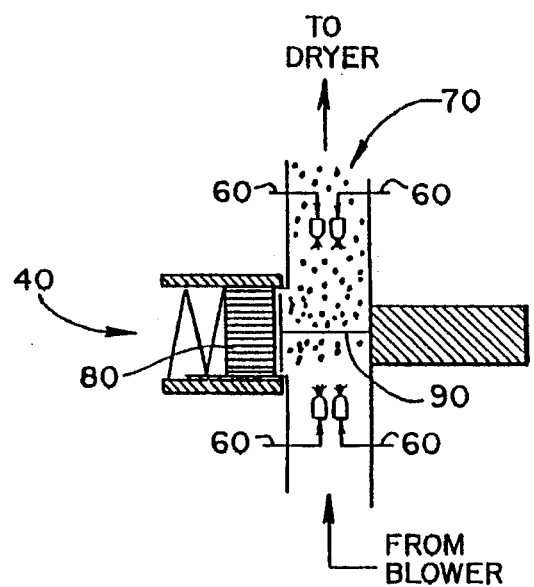
FIG. 4 is a process flow diagram illustrating the boxed portion of FIG. 3.

The steps just described are illustrated graphically in FIGS. 3 and 4. Referring first to FIG. 3, the spray coating composition is conventionally provided from liquid tanks 10 into feed tank 20, which is sufficiently sized to permit continuous operation. The effluent spray coating composition from feed tank 20 is transferred through calibrating feeder 30, which calibrates the coating feed rate relative to the rate of polymer being dewatered in extruder 40. Spray coating exiting calibrating feeder 30 are pumped by progressive cavity pumps 50 to the spray nozzles 60, shown in FIG. 4.

Turning to FIG. 4, the spray coating composition of the present invention is provided through a plurality of spray nozzles 60 to pelletized rubber 70. The rubber is pelletized as it exits extruder 40 through die head 80. The extrudate encounters pelletizer blade 90, which cuts the extrudate to pellets of appropriate dimensions.

As indicated in FIG. 4, at substantially the same time the spray coating composition is applied to the pelletized rubber, the coated rubber pellets are air-conveyed to a continuous forced air dryer (not shown). Dryer conditions are adjusted to obtain a moisture level in the rubber pellets of, for example, less than 0.5 percent, or such other moisture level as is desired in the final product.

During the drying process, the thickener in the spray coating composition (e.g., hydroxypropyl methylcellulose) also serves as a binder to bind the coating to the rubber pellets. This prevents the relatively heavy dry coating of partitioning agent from flaking off the rubber crumb during subsequent processing. The binder also aids to reduce absorption of the partitioning agent into the baled rubber during storage.

The heated, coated rubber pellets are transported to baler units to produce a bale of desirable mass, size and form. Typically, such bales are square or rectangular blocks weighing about 50 pounds or more. The bales produced by this method have a superior friability to those produced by conventional processes, and do not exhibit the deleterious effects (e.g., loss of friability due to absorption of anti-caking or partitioning agent) observed over time in bales produced by those conventional processes.

It is also observed that low viscosity styrene-butadiene rubbers (30–50 ML1+4 (100° C.)) are difficult to dry as a result of heat softening and cold flow in apron driers as described above. It has therefore been shown that application of the spray coating composition according to the present invention prevents agglomeration of the rubber, resulting in increased drying rates of 5–17 percent above conventionally processed rubbers.

Similarly, it has been observed that low molecular weight styrene butadiene rubbers, or higher viscosity polymers, that have been extended with naphthenic or aromatic oils are extremely tacky, fouling drier flights and impairing production speed through equipment down time. Dryer fouling is reduced as a result of treating the polymer pellets with the spray coating composition according to the present invention. It has been demonstrated that dryer fouling is reduced by applying to the wet rubber between 0.1 to 0.5 parts spray coating composition per hundred parts rubber hydrocarbon, and preferably about 0.2 parts spray coating composition per hundred parts rubber hydrocarbon.

The effect of coating low viscosity nitrile-butadiene rubber was studied by curing rubber samples in a sulfur donor formulation, according to the compositions shown in Table III. The addition to the rubber of 0.5 to 3.5 parts spray coating composition per hundred parts rubber hydrocarbon was shown to improve the aging properties of the rubber.

TABLE III

Sulfur Donor Recipes for Vulcanizing NBR

| Component | Quantity (Coated Rubber) | Quantity (Control Rubber) |
| --- | --- | --- |
| NYsyn ® 33-3 NBR | 100 parts | 100 parts |
| Carbon Black N787 | 75 parts | 75 parts |
| Plasticizer SC | 2 parts | 2 parts |
| Zinc Oxide | 0.5 parts | 0.5 parts |
| Stearic Acid | 1.0 parts | 1.0 parts |
| Agerite Resin D | 1.0 parts | 1.0 parts |
| Sulfasan ® | 1.0 parts | 1.0 parts |
| Pennac ™ | 2.0 parts | 2.0 parts |
| Morfax | 1.0 parts | 1.0 parts |

A significant improvement in Mooney viscosity was demonstrated in an oven aging test (Table IV). It was shown that coated rubber had a slightly higher compound Mooney viscosity, but equivalent minimum scorch and rheometer value readings indicating equivalent viscosity at higher temperatures. Table V contains the results of scorch and stress-strain tests on the coated and uncoated (control) rubbers. Table VI contains the results of immersion tests on the coated and control rubbers.

TABLE IV

Accelerated Oven Aging of Low Viscosity NBR

| Oven Aging at 212° F. (Days) | Mooney Viscosity (Coated NBR) | Mooney Viscosity (Control NBR) |
| --- | --- | --- |
| 0 | 33 | 33 |
| 3 | 33 | 42 |
| 5 | 32 | 50 |
| 7 | 36 | 67 |
| Delta | +3 | +34 |

TABLE V

Scorch and Stress-Strain Testing of Low Viscosity NBR

| Test | Press Cure at 370° F. | Coated Rubber | Control Rubber |
| --- | --- | --- | --- |
| Compound ML1 + 4 Mooney Scorch (MS at 270° F.) | | 76 | 69 |
| Minutes to 5 Pt. Rise | | 16.7 | 17.3 |
| Minimum Reading | | 21 | 22 |
| Rheograph Properties (Model 100, 370° F., 6 min. motor) | | | |
| Min. Torque (in-lbs.) | | 7 | 7 |
| Max. Torque (in-lbs.) | | 51 | 51.4 |
| ts2 (minutes) | | 1.2 | 1.25 |
| t'90 (minutes) | | 3 | 2.99 |
| Tensile (psi) | 3' | 2084 | 2254 |
|  | 6' | 2129 | 2269 |
| Elongation (percent) | | 448 | 434 |
|  | | 410 | 409 |
| 100% Modulus (psi) | | 434 | 444 |
|  | | 439 | 403 |
| 300% Modulus (psi) | | 1567 | 1750 |
|  | | 1725 | 1781 |
| Hardness (Shore A) | | 72 | 71 |
|  | | 73 | 71 |
| Compression Set (70 hrs. at 257° F., percent) | | 35.3 | 35.3 |
| Tear, Die "C" (ppi) | 3' | 307 | 319 |
|  | 6' | 295 | 318 |
| Low Temp. Brittleness (°F.) | 6' | −44 | −44 |

TABLE V-continued

Scorch and Stress-Strain Testing of Low Viscosity NBR

| Test | Press Cure at 370° F. | Coated Rubber | Control Rubber |
|---|---|---|---|
| After Oven Aging | | | |
| 70 hrs. at 257° F. | 6' | | |
| Tensile (psi) | | 2552 | 2661 |
| percent change | | 19.9 | 17.3 |
| Elongation (percent) | | 240 | 211 |
| percent change | | −41.5 | −48.4 |
| Hardness (Shore A) | | 77 | 76 |
| points change | | −4 | −5 |

TABLE VI

Immersion Testing of Low Viscosity NBR

| Test | Coated Rubber | Control Rubber |
|---|---|---|
| After Immersion in #3 Oil | | |
| 70 hrs. at 212° F.   6' | | |
| Tensile (psi) | 2265 | 2335 |
| percent change | 6.4 | 2.9 |
| Elongation (percent) | 319 | 337 |
| percent change | −22.2 | −17.6 |
| Hardness (Shore A) | 61 | 60 |
| points change | 12 | 11 |
| Volume change (percent) | 14.5 | 14.9 |
| After Immersion in Fuel B | | |
| 70 hrs. at room temp.   6' | | |
| Tensile (psi) | 1222 | 1180 |
| percent change | −42.6 | −48 |
| Elongation (percent) | 238 | 225 |
| percent change | −42 | −45 |
| Hardness (Shore A) | 47 | 47 |
| points change | 26 | 24 |
| Volume change (percent) | 34.6 | 39.3 |
| After Immersion in Fuel C | | |
| 70 hrs. at room temp.   6' | | |
| Tensile (psi) | 991 | 969 |
| percent change | −53.5 | −57.3 |
| Elongation (percent) | 187 | 187 |
| percent change | −54.4 | −54.3 |
| Hardness (Shore A) | 43 | 45 |
| points change | 30 | 26 |
| Volume change (percent) | 56.6 | 56.7 |
| After Immersion in Water | | |
| 70 hrs. at 212° F.   6' | | |
| Tensile (psi) | 2339 | 2277 |
| percent change | 9.9 | 0.4 |
| Elongation (percent) | 337 | 344 |
| percent change | −17.8 | −15.9 |
| Volume change (percent) | +4.8 | +6.3 |

The aging properties associated with the coated rubber made according to the present invention are thus substantially improved over friable rubber bales made according to conventional processes. One such result of the application of the spray coating composition according to the present invention is that friable bales of rubber may be produced having a bulk density on the order of about 1.8 times the bulk density of the loose crumb from which the bales are formed. Such bales are of significantly lower bulk density, however, than comparable massed bales of uncoated rubber. This is shown in Table VII and FIG. 1.

Figure 2:
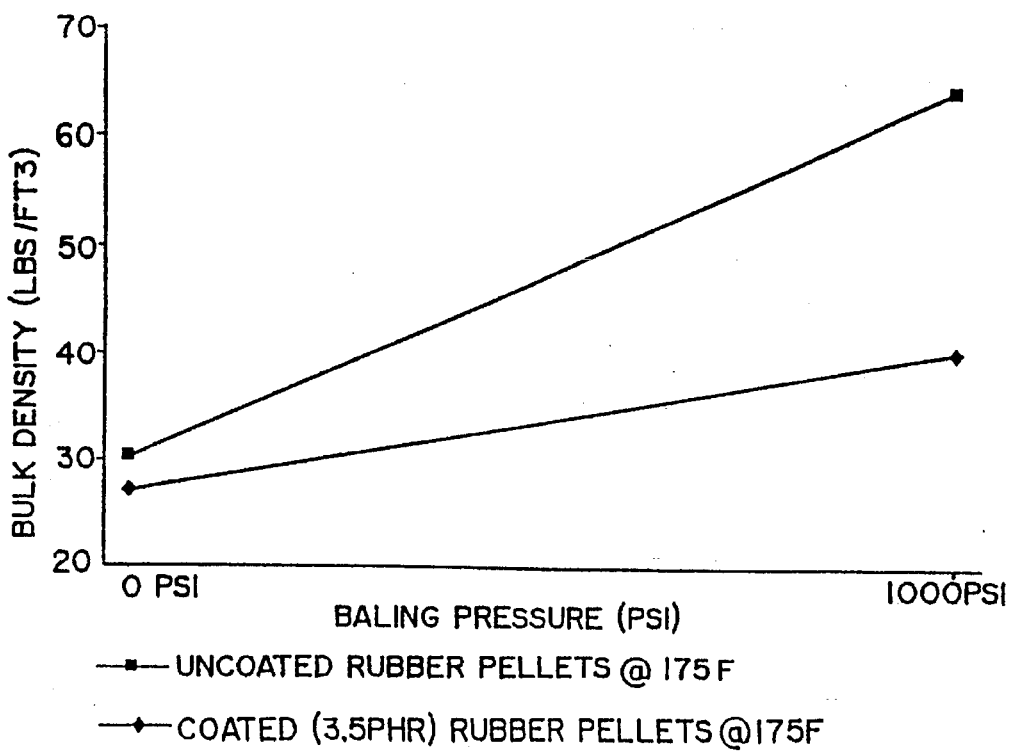
FIG. 2 is a graph illustrating the bulk density of coated and uncoated rubber pellets, before and after baling.

It is also shown in Table VII and FIG. 2 that variation of the amount of coating applied to the rubber can be employed to produce specific desirable characteristics, such as bulk density and degree of friability. Thus, application of 1.5 parts coating per hundred parts rubber hydrocarbon resulted in a bale of lower bulk density than one of uncoated rubber, but not friable at room temperature by hand. By contrast, application of 3.5 parts coating per hundred parts rubber hydrocarbon produced a bale of still lower bulk density, but desirably hand friable at room temperature.

TABLE VII

Bulk Density of Baled Rubber[a]

| Rubber (parts) | 100 | 100 | 100 | 100 | 100 |
|---|---|---|---|---|---|
| Coating (parts) | 0 | 0 | 1.5 | 3.5 | 3.5 |
| Form | Loose Crumb | Massed Bale | Massed Bale | Loose Crumb | Friable Bale |
| Bulk Density (lbs./cu.ft.) | 30.32 | 64.65 | 58.93 | 27.05 | 40.25 |

[a] — All bales were formed in a laboratory mini-baler at 1000 psi and 175° F. for 10 seconds.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A composition for coating wet rubber particles during extrusion and pelletization comprising a water soluble thickener and binder reagent, water, a water soluble anionic dispersant and an inorganic partitioning agent selected from the group consisting of (a) $MgCO_3$, (b) $CaCO_3$ and (c) $ZnCO_3$.

2. The composition of claim 1, wherein the thickener also acts as a binder upon drying.

3. The composition of claim 1, wherein the thickener and binder reagent is a cellulose thickener and binder.

4. The composition of claim 1, wherein the thickener and binder reagent is selected from the group consisting of cellulose and hydroxyalkyl celluloses.

5. The composition of claim 1, wherein the water soluble anionic dispersant is selected from the group consisting of alkali metal salts of carboxylated polyelectrolytes and sodium salts of condensed naphthalenesulfonic acid.

6. The composition of claim 5, wherein the water soluble anionic dispersant is sodium polymethacrylate.

7. A spray coating composition for application to rubber consisting of magnesium carbonate, hydroxypropyl methylcellulose and sodium polymethacrylate.

8. The composition of claim 1, wherein the amount of thickener and binder reagent is about 0.1 to about 0.5 parts by weight per 100 parts by weight of the inorganic partitioning agent.

9. The composition of claim 1, wherein the amount of thickener and binder reagent is about 0.25 parts by weight per 100 parts by weight of the inorganic partitioning agent.

10. The composition of claim 1, wherein the amount of dispersant is 0.25–0.50 parts dispersant per 100 parts partitioning agent.

11. The composition of claim 1, wherein the rubber is selected from the group consisting of acrylate-butadiene rubber; butadiene rubber; chloroprene rubber; terpolymers of ethylene, propylene, and a diene (with the residual unsaturated portion of diene in the side chain); ethylene-propylene copolymer; isobutene-isoprene copolymer; isoprene rubber; nitrile-butadiene rubber; nitrile-isoprene rubber; styrene-butadiene rubber; and carboxylated-styrene-butadiene rubber.

12. The composition of claim 11, wherein the rubber has a Mooney viscosity of less than 30 ML1+4 at 100° C.

13. The composition of claim 11, wherein the rubber has a Mooney viscosity of 20–125 ML1+4 at 100° C.

14. The composition of claim 11, wherein the rubber is a nitrile-butadiene rubber having about 45–60 percent by weight bound acrylonitrile.

15. The composition of claim 11, wherein the rubber is a styrene-butadiene rubber having about 30–50 percent by weight bound styrene.

16. A method of preparing the composition of claim 1, comprising the steps of:
    ball milling the inorganic partitioning agent to a particle size of about 1 micron;
    adding sufficient quantity of the thickener and binder reagent in aqueous solution to the partitioning agent to surround particles of the inorganic partitioning agent with the thickener and binder reagent solution; and,
    adding the dispersant in aqueous solution to the inorganic partitioning agent and thickener and binder reagent solution in sufficient quantity to reduce the viscosity of the composition to a viscosity suitable for use in a spray coating process.

17. The method of claim 16, wherein the average particle size of the inorganic partitioning agent is about 1.2 microns after ball milling.

18. The method of claim 16, wherein the amount of thickener and binder reagent is from about 0.1 to about 0.5 parts per hundred parts of the inorganic partitioning agent.

19. The method of claim 16, wherein the amount of thickener and binder reagent is about 0.25 parts per hundred parts of the inorganic partitioning agent.

20. The method of claim 16, wherein the amount of dispersant is from about 0.25 to about 0.50 parts by weight per 100 parts partitioning agent.

21. The method of claim 16, wherein the thickener and binder reagent is selected from the group consisting of cellulose and hydroxyalkyl celluloses.

22. The method of claim 16, wherein the dispersant is selected from the group consisting of alkali metal salts of carboxylated polyelectrolytes and sodium salts of condensed naphthalenesulfonic acid.

23. The method of claim 16, wherein the viscosity of the composition is about 300 cps.

* * * * *